United States Patent
Anand et al.

(10) Patent No.: US 8,119,181 B2
(45) Date of Patent: Feb. 21, 2012

(54) PROCESS FOR PRODUCING NUT-BASED EXPANDABLE PELLETS AND NUT-BASED SNACK CHIPS

(75) Inventors: Ashish Anand, Plano, TX (US); Robin S. Hargrove, Newbury (GB); Dimitris Lykomitros, Dallas, TX (US); V. N. Mohan Rao, Plano, TX (US)

(73) Assignee: Frito-Lay North America, Inc., Plano, TX (US)

( * ) Notice: Subject to any disclaimer, the term of this patent is extended or adjusted under 35 U.S.C. 154(b) by 894 days.

(21) Appl. No.: 11/691,805

(22) Filed: Mar. 27, 2007

(65) Prior Publication Data

US 2008/0241332 A1    Oct. 2, 2008

(51) Int. Cl.
 *A21D 13/00*    (2006.01)

(52) U.S. Cl. ........ 426/550; 426/559; 426/560; 426/632; 426/640; 426/454; 426/516; 426/518; 426/523; 426/808

(58) Field of Classification Search .................. 426/445, 426/496, 507, 560, 453–455, 629, 632, 640, 426/512, 516–517, 520, 808
See application file for complete search history.

(56) References Cited

U.S. PATENT DOCUMENTS

| | | | |
|---|---|---|---|
| 3,259,503 A * | 7/1966 | Tan et al. ...................... | 426/559 |
| 3,637,400 A * | 1/1972 | Mullen et al. .................. | 426/93 |
| 3,937,852 A | 2/1976 | Wolf | |
| 4,328,741 A | 5/1982 | Yoshikazu | |
| 5,102,677 A | 4/1992 | Van Den Berghe | |
| 5,366,749 A | 11/1994 | Frazee et al. | |
| 5,498,438 A * | 3/1996 | Strong et al. ................... | 426/632 |
| 6,228,414 B1 | 5/2001 | Villagran et al. | |
| 6,242,034 B1 * | 6/2001 | Bhaskar et al. ............... | 426/560 |
| 6,432,463 B1 * | 8/2002 | Bhaskar et al. ............... | 426/496 |
| 6,555,153 B1 * | 4/2003 | Keller et al. ................... | 426/516 |
| 6,569,481 B1 * | 5/2003 | Malfait ......................... | 426/446 |
| 6,676,983 B2 | 1/2004 | Malfait | |
| 6,899,909 B2 | 5/2005 | Malfait | |
| 6,929,813 B2 | 8/2005 | Malfait | |

(Continued)

FOREIGN PATENT DOCUMENTS

WO    2005074727    8/2005

OTHER PUBLICATIONS

Kashaninejad, et al., Some physical properties of Pistachio (*Pistacia vera* L.) nut and its kernel, Journal of Food Engineering, Jan. 2006, vol. 72, No. 1, pp. 30-38 (p. 30, abstract).

(Continued)

*Primary Examiner* — Drew Becker
*Assistant Examiner* — Luana Z Long
(74) *Attorney, Agent, or Firm* — Colin P. Cahoon; Amanda K Jenkins; Carstens & Cahoon, LLP

(57) ABSTRACT

A method is disclosed for producing an intermediary product in the form of a nut-based pellet that is capable of being stored for up to about six months. To form the nut pellets, a nut dough is passed through an extruder. The extrudate produced is then cut into pellets and dried. Starch pellets can then optionally be mixed with the nut pellets or small nut pieces and cooked to form a snack chip. The snack chip is formed by compressing and cooking the pellet mixture, expanding the pellet mixture, and compressing the pellet mixture again.

21 Claims, 1 Drawing Sheet

U.S. PATENT DOCUMENTS

| | | | |
|---|---|---|---|
| 7,135,201 | B2 | 11/2006 | Malfait |
| 7,141,257 | B2 | 11/2006 | Malfait |
| 8,062,685 | B2 * | 11/2011 | Anand et al. ................. 426/559 |
| 2004/0219280 | A1 | 11/2004 | Green et al. |
| 2005/0150392 | A1 | 7/2005 | Van Poucke |
| 2006/0013934 | A1 * | 1/2006 | Villagran et al. ............. 426/549 |

OTHER PUBLICATIONS

Michael Chu "Kellogg's Rice Krispies Treats" Retrieved from the Internet: URL: http://www.cookingforengineers.com/recipe/104/Kelloggs-Rice-Krispies-Treats/print.

* cited by examiner

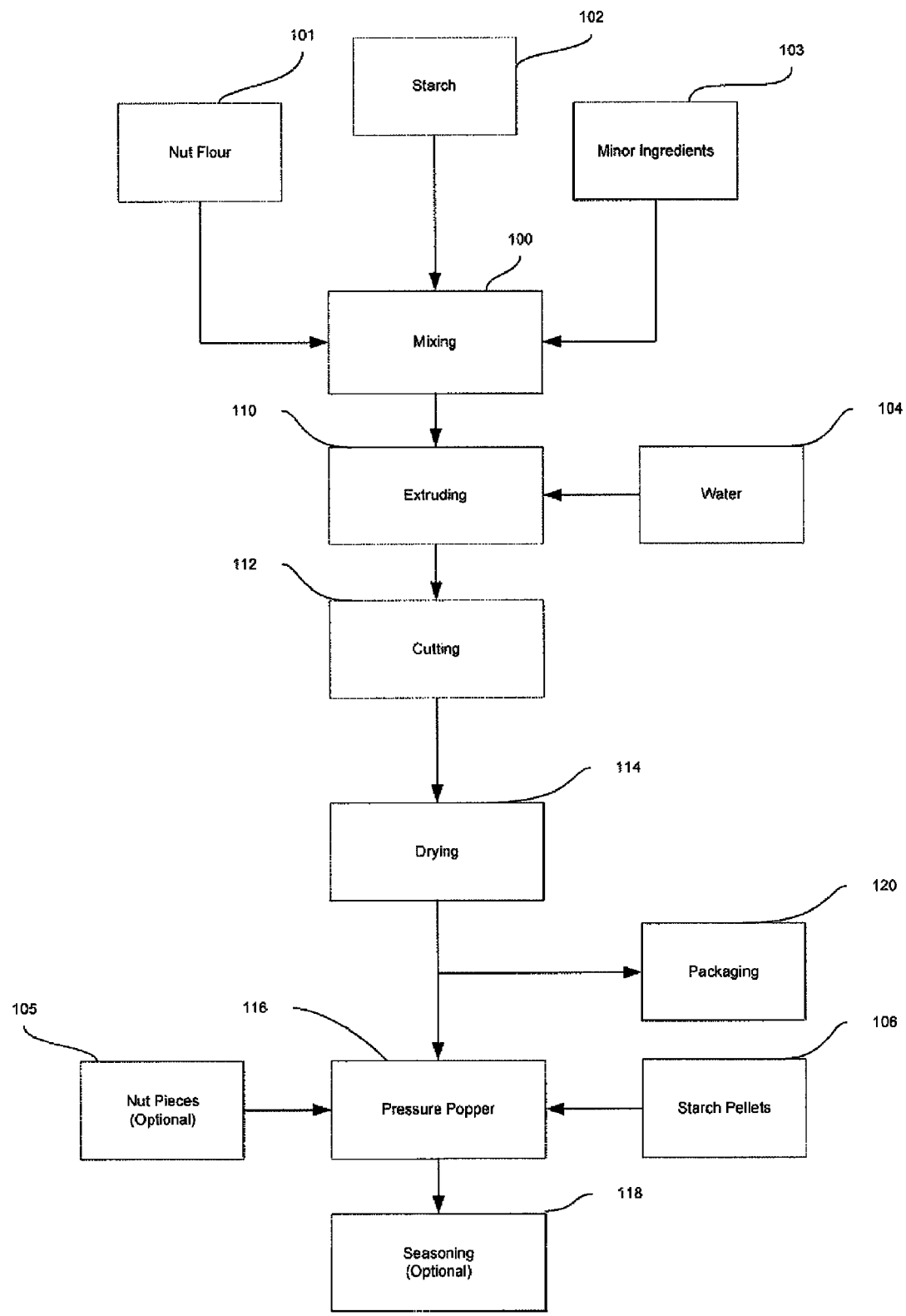

1

PROCESS FOR PRODUCING NUT-BASED EXPANDABLE PELLETS AND NUT-BASED SNACK CHIPS

BACKGROUND OF THE INVENTION

1. Technical Field

The present invention relates to a process for producing expandable nut-based pellet snacks and, in particular, to a process for producing expandable pellets using an extruder. The process produces shelf stable half-products, or pellets, which can be later processed into finished snack chips. The present invention also relates to a process of pressure cooking the shelf stable half-products and other ingredients to produce a snack chip.

2. Description of Related Art

Finished snack products made with pellets typically require two steps to produce. In a first step, the ingredients, which generally include cereal products and starches, are hydrated to form an extrudable mixture. During extrusion, the ingredients are partially gelatinized creating dough, which is passed through a die to form an extrudate. The extrudate is then cut into pellets (with or without lamination) and processed through a dryer to partially dehydrate the pellets. This dehydrated pellet, or half product, can then be stored and later processed, or immediately processed in a second cooking step.

One advantage of a half-product is that it is inexpensive and easy to handle. Because half-products or pellets can be stored for relatively long periods of time before further processing, they can be centrally manufactured and shipped to several facilities in different geographical regions for a final cooking step. Further, following cooking, seasonings can be added that accommodate diverse geographical preferences.

Prior art pellet making processes have focused upon corn-based products, as illustrated by U.S. Pat. Nos. 6,224,933 and 6,242,034 and potato-based products, as illustrated by U.S. Pat. No. 6,432,463. While potato-based snack products and corn-based snack products are known, it would be desirable to have food products made with alternative compositions to make products that have different nutritional and flavor profiles. For example, many consumers are increasingly health conscious and desire healthier, naturally flavored snack food products with higher levels of protein and fiber, and lower levels of fat than many traditional corn or potato-based snack foods. After frying, corn-based products can have an oil content of more than 25% by weight and the potato-based products can have an oil content of more than 35% by weight. Further, corn-based products have a very distinctive flavor, which can result in a limited set of flavor profiles.

Nuts are considered by consumers to be a healthy food product. Peanuts and other types of nuts are preferred snack items because they have a high protein content. Many nuts also have high fiber content, which has been attributed to reducing a person's risk of certain cancers, diabetes, digestive disorders, and heart diseases. Fiber may also help people control obesity, because insoluble fiber is not digested and passes through the digestive system virtually in tact, providing bulk but very few calories. Studies have also shown that people who consume nuts on a regular basis are less likely to suffer from coronary heart disease and can lower their LDL cholesterol levels, probably due to the fatty acid profile of nuts.

No prior art process has been successful in creating an extruded half-product with a high content of nuts, nor has the prior art been able to produce desirable chip-like snacks from such half-products. Accordingly, a need exists for a process for making expandable nut-based pellets which have pellet attributes including significant storability, and using the nut-based pellets to make chip like snacks with improved shape, texture, and flavor while being easily manufactured. Further, the expandable pellet and snack chip should, in one embodiment, provide the consumer with a reduced fat, and/or higher protein and fiber snack food while providing desirable nut flavor profiles.

SUMMARY OF THE INVENTION

The invention comprises a process for producing nut-based expandable pellets and snack chips. The nut base comprises nut flour. In one embodiment, one or more secondary ingredients selected from pre-gelatinized starches, native starches, and/or flour(s) are added to the nut flour thereby forming a nut flour admix. Additionally, minor ingredients such as sugar, salt, oil and/or an emulsifier can optionally be added to the nut flour admix.

The nut flour admix is routed through an extruder, where water is added to the nut flour admix to produce a nut dough. The extruder mechanically mixes, shears and cooks the nut dough before passing it through a die to form an extrudate. The extrudate is then cut into pellets.

Once the pellets are formed, they are dried until the moisture content of the pellets is reduced to between about 10% and about 15% by weight. The dried pellets are then ready for packaging or cooking.

In one aspect, the invention provides a method for making a reduced-fat, high protein, nut-based snack chip. Initially, a pellet mixture is introduced into a pressure popper. In one embodiment, the nut pellet mixture comprises nut-based pellets and starch-based pellets, such as rice pellets. In another embodiment, the pellet mixture comprises nut-based pellets, starch-based pellets and nut pieces. In still another embodiment, the pellet mixture comprises starch-based pellets and nut pieces.

The pressure popper compresses the pellet mixture between a top plate and a bottom plate inside a mold and bakes the pellet mixture to form a pressed cake. The top and bottom plate then quickly retract, allowing steam to escape from the pressed cake and expand it, producing an expanded cake. While the expanded cake is still in a plastic or molten state, the expanded cake is compressed again between the top and bottom plate to produce a thin, crispy snack chip. The top and bottom plates retract again, although this time more slowly, and the snack chip is expelled from the popper. The snack chip can then be seasoned and packaged. In this embodiment, the seasoned, packaged nut-based snack chip comprises less than about 5 grams of fat in a 28 gram serving.

The above as well as additional features and advantages of the present invention will become apparent in the following written detailed description.

BRIEF DESCRIPTION OF THE DRAWINGS

The novel features believed characteristic of the invention are set forth in the appended claims. The invention itself however, as well as a preferred mode of use, further objectives and advantages thereof, will be best understood by reference to the following detailed description of illustrative embodiments when read in conjunction with the accompanying drawings, wherein:

FIG. 1 is a flow chart showing the process for making a nut-based expandable pellet and nut-based snack chip.

DETAILED DESCRIPTION

The present invention is a process that generates nut-based pellets, or half-products, that are shelf stable and can be cooked immediately or at a later time (up to 6 months). As used herein, the term "nut" is used in the culinary sense and includes any large, oily kernel found within a shell and used in food, and includes lentils. FIG. 1 shows a schematic block diagram illustrating various processes for making pellets from a nut base in accordance with various embodiments of the present invention. In one embodiment, one or more primary ingredients comprising a nut flour composition 101 is mixed with one or more secondary ingredients 102 comprising starches and optionally one or more minor ingredients 103 such as sugar, oil, emulsifier, or salt in a dry mixer 100 to make a nut flour admix.

The nut flour composition 101 can comprise one or more types of nut flour. For example, the nut flour composition 101 can be selected from one or more nut flour varieties selected from peanut flour, almond flour, cashew flour, pistachio flour, pecan flour and lentil flour. Peanut flour can be desirable because it is cost effective and, at the time of this application, one of the few nut flours that is commercially available for purchase in bulk. Preferably, defatted nut flour is used. The preferred defatted nut flour comprises less than about 15% fat and at least about 45% protein. Lentil flour is also preferred because it is low in fat and high in fiber and protein. Additionally, lentils have a desirable amino acid profile, which means the nutritional quality of the lentil proteins is high. In alternative embodiments, a mixture of seeds and/or small pieces of fruit can be used in conjunction with the secondary ingredients described below to make pellets. As used herein, nut flour is defined as a mixture of nut particles, wherein almost all of the nut particles pass through a #40 Mesh Screen based on the U.S. Sieve Scale. A U.S. #40 Mesh Screen has openings sized approximately 0.42 millimeters. A preferred nut particle size distribution for the nut flour is as follows: about 0.3% retained on a #40 Mesh Screen; about 1.8% retained on a #60 Mesh Screen; about 4.1% retained on a #80 Mesh Screen; about 4.4% retained on a #100 Mesh Screen; and about 95.6% passing through a #100 Mesh Screen. All Mesh Screen sizes are based on the U.S. Sieve Scale and the opening size for each Mesh Screen is summarized in the following table:

|            | Opening Size |        |
|------------|--------------|--------|
| U.S. Sieve # | Millimeters | Inches |
| 40         | 0.420        | 0.0165 |
| 60         | 0.250        | 0.0098 |
| 80         | 0.177        | 0.0070 |
| 100        | 0.149        | 0.0059 |

In one embodiment, secondary ingredients 102 comprising one or more starches are added to the nut flour admix as a binder for the half-product pellets. Secondary ingredients 102 can comprise one or more starch ingredients selected from native starch, pre-cooked starch, and/or modified starches. The starch ingredients can be derived from, for example, rice, corn, potato, or tapioca. The preferred secondary ingredients comprise a native potato starch, a native tapioca starch, and a modified corn starch. A suitable modified corn starch is X-PAND'R Starch available from AE Staley Manufacturing Company, headquartered in London, U.K. Native potato and tapioca starches suitable for use in the present invention are available from Avebe Food.

In one preferred embodiment, the nut flour admix comprises about 40% to about 60% nut flour, about 15% to about 25% native potato starch, about 15% to about 25% native tapioca starch, about 5% to about 15% modified corn starch, and less than about 3% sugar. In another preferred embodiment, the nut flour admix comprises about 45% to about 55% nut flour, about 18% to about 23% native potato starch, about 17% to about 22% native tapioca starch, about 7% to about 12% modified corn starch, and less than about 2% sugar. In still another embodiment, the nut flour admix comprises about 50% nut flour, about 21% native potato starch, about 19% native tapioca starch, about 8% modified corn starch, and about 2% sugar. All percentages used herein are by weight unless otherwise noted.

Referring again to FIG. 1, the components of the nut flour admix are first mixed together 100 to form the nut flour admix, which is then fed to an extruder 110 for mixing and hydration with water 104 and/or steam. Optionally, a pre-conditioning step (not shown) is included between the mixing step 100 and the extruder 110 to partially hydrate and partially gelatinize the mixture. During extrusion, the mixture is mechanically mixed, sheared and cooked in an extruder 110 at low shear to produce a nut dough. As used herein, a low shear is defined as a Specific Mechanical Energy (SME) range of about 100 to about 140 w-h/kg of extrudate on a dry basis. The mixture is then passed through a die to form an extrudate. In one embodiment, the extrudate is cut into nut pellets immediately upon exiting the extruder die. Upon passing through the die, in one embodiment, the extrudate has a square cross section, and is cut 112 into cube-shaped pellets using a rotary cutter at the die face plate. In another embodiment, the extrudate has a circular or oval cross section, and is cut 112 into lobe shaped pellets preferably having a diameter between about 1 millimeters and about 20 millimeters. Pellets of different shapes and sizes provide different visual attributes during the production of the snack chips of the present invention. As will be described in more detail below, nut pellets, which tend to be darker in color, are mixed with starch pellets, which tend to be lighter in color. When the pellet mixture is used to make a compressed snack chip, the nut pellets are visually discernable from the starch pellets.

Before they are dried, the extruded cut pellets preferably comprise a moisture content of greater than about 25% and more preferably greater than about 30%. After the pellets have been extruded 110 and cut 112, they can then be sent to one or more ovens for dehydration in a drying step 114 to produce dried pellets. The dried pellets preferably have a moisture content between about 10% and about 15%. More preferably, the dried pellets have a moisture content between about 11% and about 14%. In one embodiment, the drying or dehydration step 114 comprises a shaker or rotary dryer, short or pre-dryer, and finishing dryer for drying the pellets to a moisture level for packaging. After drying, the dried pellets can be cooled atmospherically on a slow moving conveyor belt to ambient temperature and can then be packaged 120 for later processing or can be routed for immediate cooking into a snack chip using a pressure popper 116.

Pellets manufactured in accordance with the above-described features are capable of being stored for up to about six months. Upon being cooked, these pellets can comprise a part of a nut-based snack product that has a unique flavor and nutritional profile.

To form a nut-based snack chip using the dried nut-based pellets of the present invention, a pressure popper 116 is used. The pressure popper used in the present invention comprises a top plate, a bottom plate and a mold. The mold preferably has an interior perimeter that is circular in cross section, but can be any desired shape. The top plate and bottom plate have a perimeter that is similar in size and shape to the interior perimeter of the mold.

To make the snack chips of the present invention, the bottom plate initially forms a cavity inside the mold. Next, a mixture of nut pellets of the present invention and starch pellets 106 are placed inside the cavity. The pellet mixture preferably comprises nut pellets and starch pellets at about a 50:50 weight ratio. Starch pellets are known in the art, but are generally made as follows: beginning with a floured food starch, the starch is gelatinized in an extruder under a pressure and temperature. The food starch is then extruded and cut, forming individual pellets. The preferred starch pellet is a rice pellet.

In one embodiment, small nut pieces 105 are placed inside the cavity along with the pellet mixture. In another embodiment, the nut pellet mixture comprises about 30% to about 40% nut pellets, about 30% to about 40% starch pellets, and about 25% to about 35% nut pieces. In still another embodiment, the weight ratio of nut pellets to starch pellets to nut pieces is about 35:35:30.

According to one embodiment, along with the starch pellets, small nut pieces 105 are placed inside the cavity instead of the nut pellets. According to another embodiment, the small nut pieces have preferably been dried to between about 1% and about 8% moisture by weight, and comprise between about 25% and about 90% of the total weight of the mixture inside the cavity. When nut pieces are used in place of nut pellets, starch pellets comprise between about 5% and about 75% of the total weight of the mixture inside the cavity.

Once the pellet mixture is in the cavity created by the bottom plate inside the mold, the pressure popper 116 forces the top plate and bottom plate towards each other until the pellet mixture is compressed into a compressed cake. The pressure exerted on the pellet mixture ranges between about 1200 pounds per square inch (psi) and about 2200 psi. In one embodiment, the time interval between the instant the top plate first contacts the pellet mixture and the instant the top plate stops moving towards the bottom plate is between about 1 second and about 4 seconds. In another embodiment, the rate of travel for the top plate is between about 0.01 meters per second and about 0.4 meters per second, and the rate of travel for the bottom plate is about 0.001 meters per second and about 0.4 meters per second.

The top plate and bottom plate are also heated during compression, which cooks the ingredients in the compressed pellets to produce a pressed cake. In one embodiment, the temperature of the top plate is between about 190° C. and about 230° C., and the temperature of the bottom plate is between about 200° C. and about 240° C. In yet another embodiment, the pressed cake is preferably cooked for between about 1 second and about 4 seconds after the top plate and bottom plate have stopped moving towards the pressed cake. Thus, in one embodiment, the total time for the compression and cooking step is between about 2 seconds and about 8 seconds.

Once the pellets have been compressed and cooked, the pressure popper rapidly moves the top plate and bottom plate away from the pressed cake, which quickly reduces the pressure on the pressed cake and causes moisture to escape from the pressed cake as steam. In one embodiment, the rate of travel for the top plate is between about 0.01 meters per second and about 0.4 meters per second, and the rate of travel for the bottom plate is about 0.001 meters per second and about 0.4 meters per second. The escaping steam expands the pressed cake, producing an expanded cake. While the expanded cake is still hot and in a molten, flowing, or plastic state, the pressure popper moves the top plate and bottom plate towards expanded cake, causing the expanded cake to be compressed. In a preferred embodiment, the expanded cake is recompressed to a thickness between about 1.5 millimeters and about 3 millimeters. Preferably, the top and bottom plates remain heated during the recompression step. The recompressed cake ultimately comprises the snack chip of the present invention. The top plate and bottom plate slowly move away from each other and the snack chip is ejected from the pressure popper once it has cooled to a temperature below its phase transition temperature (ie. once it is sufficiently solid to maintain its structure outside the mold). By moving the top plate and bottom plate away from each other slowly, the re-compressed cake is not appreciably expanded a second time. The snack chip is then optionally seasoned 118 to taste.

EXAMPLE 1

Peanut Based Chip Formed from Peanut Based Pellet Product

Peanut Pellet Preparation

A peanut flour admix comprising 50% partially defatted peanut flour, 21% native potato starch, 19% native tapioca starch, 8% modified corn starch, and 2% sugar were added to a twin screw extruder. The partially defatted peanut flour comprised less than about 14% fat and about 50% protein by weight. The mixture was hydrated with water to between about 30% and about 35% moisture by weight to produce a peanut dough. The peanut dough was extruded through a round die orifice, and cut into lobe shaped pellets approximately 2.5 millimeters in diameter. The extruded, cut pellets were then dried in an Enersyst drying oven at between about 210° F. and about 220° F. for between 15 minutes and 20 minutes. The partially dehydrated pellets were then allowed to air dry at ambient temperature for 2 to 3 days. The dried pellets had a moisture content between about 11% and about 14% after ambient drying.

Peanut Chip Preparation

The peanut pellets prepared above were mixed with rice pellets and pieces of peanut at a weight ratio of about 35:35:30 in a hopper attached to a pressure popper. In the pressure popper, the bottom plate initially formed a cavity inside the mold. The pellet mixture was then fed from the hopper into the cavity and the top plate and bottom plate compressed and cooked the pellet mixture between them. The temperature of the top plate was about 210° C. and the temperature of the bottom plate was about 220° C. The pressure between the top and bottom plate was about 1400 psi. The pellet mixture between the stationary plates was cooked under pressure for about 2.5 seconds to produce a pressed cake. The top plate and bottom plate then moved away from the pressed cake at for about 40 milliseconds to produce an expanded cake. While the expanded cake was still in a molten or flowing plastic state, the plates recompressed the expanded cake to produce a peanut based snack chip between about 1.5 and about 3 millimeters thick. The top and bottom plates then slowly moved away from the snack chip at a rate slow enough to prevent appreciable expansion of the snack chip. The snack chip was allowed to cool before being ejected from the pressure popper.

While the invention has been particularly shown and described with reference to a preferred embodiment, it will be understood by those skilled in the art that various changes in form and detail may be made therein without departing from the spirit and scope of the invention.

What is claimed is:

1. A method for making an expandable nut-based product comprising the steps of:
    hydrating a nut flour admix in an extruder to make a nut dough;
    extruding said nut dough through said extruder at a low shear rate to produce an extrudate;
    cutting said extrudate into nut pellets immediately upon exiting said extruder; and
    drying said nut pellets to a moisture content of between about 10% and about 15% by weight to produce a dried nut pellet.

2. The method of claim 1 wherein said nut flour admix comprises nut flour and starch.

3. The method of claim 2 wherein said nut flour admix further comprises, by weight:
    about 40% to about 60% said nut flour; and
    about 40% to about 60% said starch.

4. The method of claim 2 wherein said starch comprises native potato starch, native tapioca starch and modified corn starch.

5. The method of claim 4 wherein said nut flour admix further comprises:
    about 40% to about 60% said nut flour;
    about 15% to about 25% said native potato starch;
    about 15% to about 25% said native tapioca starch; and
    about 5% to about 15% said modified corn starch.

6. The method of claim 4, wherein said nut flour admix further comprises, by weight:
    about 45% to about 55% said nut flour;
    about 18% to about 23% said native potato starch;
    about 17% to about 22% said native tapioca starch; and
    about 7% to about 12% said modified corn starch.

7. The method of claim 4, wherein said nut flour admix further comprises, by weight:
    about 50% said nut flour;
    about 21% said native potato starch;
    about 19% said native tapioca starch; and
    about 8% said modified corn starch.

8. The method of claim 2, wherein said nut flour admix further comprises sugar.

9. The method of claim 1, wherein said nut flour admix comprises one or a combination of nut flours selected from the group consisting of peanut flour, cashew flour, pistachio flour, almond flour and lentil flour.

10. The method of claim 1, wherein said dried nut pellets further comprise cube shaped nut pellets.

11. The method of claim 1, wherein said extruder imparts a specific mechanical energy of between about 100 to about 140 watt-hours per kilogram of said extrudate on a dry basis.

12. The method of claim 1, wherein said dried nut pellets are lobe shaped pellets having a diameter of between about 1 millimeter and about 20 millimeters.

13. The method of claim 1 wherein said nut pellets comprise a moisture content of at least about 25% by weight after said cutting and before said drying.

14. The method of claim 1 wherein said nut pellets comprise a moisture content of at least about 30% by weight after said cutting and before said drying.

15. The method of claim 1 further comprising:
    mixing said dried nut pellets with starch pellets to produce a pellet mixture;
    compressing and cooking said pellet mixture to produce a pressed cake;
    expanding said pressed cake to produce an expanded cake; and
    compressing said expanded cake to produce a nut-based snack chip.

16. The method of claim 15 wherein said pellet mixture further comprises a weight ratio of said dried nut pellets to said starch pellets of about 50:50.

17. The method of claim 15 wherein said pellet mixture additionally comprises nut pieces.

18. The method of claim 17 wherein said pellet mixture further comprises a weight ratio of said dried nut pellets to said starch pellets to said nut pieces of about 35:35:30.

19. The method of claim 15 wherein said compressing and cooking occurs at a temperature between about 190° C. and about 250° C.

20. The method of claim 15 wherein said compressing and cooking occurs at a pressure between about 1200 pounds per square inch to about 2200 pounds per square inch.

21. The method of claim 15 wherein said starch pellets comprise rice pellets.

* * * * *